US006678516B2

(12) United States Patent
Nordman et al.

(10) Patent No.: US 6,678,516 B2
(45) Date of Patent: *Jan. 13, 2004

(54) METHOD, SYSTEM, AND APPARATUS FOR PROVIDING SERVICES IN A PRIVACY ENABLED MOBILE AND UBICOM ENVIRONMENT

(75) Inventors: Ian Nordman, Söderkulla (FI); Tero Alamäki, Helsenki (FI); Marko Vänskä, Espoo (FI); Norbert Gyorbíró, Helsenki (FI); Casper Gripenberg, Helsenki (FI); Mikko Tarkiainen, Espoo (FI)

(73) Assignee: Nokia Corporation, Espoo (FI)

( * ) Notice: Subject to any disclaimer, the term of this patent is extended or adjusted under 35 U.S.C. 154(b) by 24 days.

This patent is subject to a terminal disclaimer.

(21) Appl. No.: 09/860,551

(22) Filed: May 21, 2001

(65) Prior Publication Data

US 2002/0173296 A1 Nov. 21, 2002

(51) Int. Cl.[7] .............................. H04M 11/10
(52) U.S. Cl. ............... 455/414.1; 455/456; 455/457; 455/410; 455/411; 455/41.1; 709/203; 709/206; 707/1; 705/51; 370/338
(58) Field of Search ............... 455/456, 457, 455/410, 411, 41.2, 414.1; 340/539; 709/203, 206; 370/338; 707/1; 705/51

(56) References Cited

U.S. PATENT DOCUMENTS

| 4,969,096 A | 11/1990 | Rosen et al. |
| 5,237,157 A | 8/1993 | Kaplan |
| 5,722,418 A | 3/1998 | Bro |
| 5,743,054 A | 4/1998 | Luchetti et al. |
| 5,754,938 A | 5/1998 | Herz et al. |
| 5,754,939 A | 5/1998 | Herz et al. |
| 5,835,087 A | 11/1998 | Herz et al. |
| 5,848,396 A | 12/1998 | Gerace |

(List continued on next page.)

FOREIGN PATENT DOCUMENTS

WO   WO 99/44159   9/1999

OTHER PUBLICATIONS

Miller et al. "Technology Basics", Bluetooth Revealed, 2001, Chapter 2, pp. 15–27.
Miller et al. "Bluetooth Usage Models", Bluetooth Revealed, 2001, Chapter 3, pp. 29–45.
Miller et al. "Introduction to the Bluetooth Specification", Bluetooth Revealed, 2001, Chapter 4, pp. 47–56.

Primary Examiner—William Trost
Assistant Examiner—Danh C Le
(74) Attorney, Agent, or Firm—Morgan & Finnegan, LLP

(57) ABSTRACT

A method, system, and apparatus for protecting personal privacy in a wireless local area network using a framework at both the terminal and the service in the wireless local area network. The terminal includes a memory that stores the profile data for a user. The terminal is coupled by radio frequency to an access point that is also coupled to a wired network such as the Internet. A service operator coupled to the wired network offers a service opportunity to the user by sending a message to the terminal that includes the service opportunity. If the profile data for the user indicates that the user is interested in either this type of service opportunity or this particular service, the user sends at least a portion of the profile data to the service operator. The service operator uses the profile data to personalize the service prior to sending it to the user. If the profile data for the user indicates that the user does not want to disclose the profile data for this service opportunity, the service operator can only respond by sending a default service opportunity or not sending any service opportunity.

26 Claims, 6 Drawing Sheets

U.S. PATENT DOCUMENTS

| | | | |
|---|---|---|---|
| 5,852,775 A | * 12/1998 | Hidary | 455/404 |
| 5,873,068 A | 2/1999 | Beaumont et al. | |
| 5,892,900 A | 4/1999 | Ginter et al. | |
| 5,899,025 A | 5/1999 | Casey et al. | |
| 5,901,246 A | 5/1999 | Hoffberg et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,949,876 A | 9/1999 | Ginter et al. | |
| 5,963,916 A | 10/1999 | Kaplan | |
| 5,982,891 A | 11/1999 | Ginter et al. | |
| 6,029,195 A | 2/2000 | Herz | |
| 6,088,598 A | * 7/2000 | Marsolais | 455/414 |
| 6,115,709 A | 9/2000 | Gilmour et al. | |
| 6,134,548 A | 10/2000 | Gottsman et al. | |
| 6,141,760 A | 10/2000 | Abadi et al. | |
| 6,154,783 A | 11/2000 | Gilmour et al. | |
| 6,216,014 B1 | 4/2001 | Proust et al. | |
| 6,222,458 B1 | 4/2001 | Harris | |
| 6,405,027 B1 | 6/2002 | Bell | |
| 2001/0028304 A1 | * 10/2001 | I'Anson et al. | 340/539 |
| 2002/0147766 A1 | * 10/2002 | Vanska et al. | 709/203 |
| 2002/0174073 A1 | * 11/2002 | Nordman et al. | 705/64 |
| 2003/0087652 A1 | * 5/2003 | Simon et al. | 455/466 |
| 2003/0100315 A1 | * 5/2003 | Rankin | 455/456 |
| 2003/0105719 A1 | * 6/2003 | Berger et al. | 705/51 |

* cited by examiner

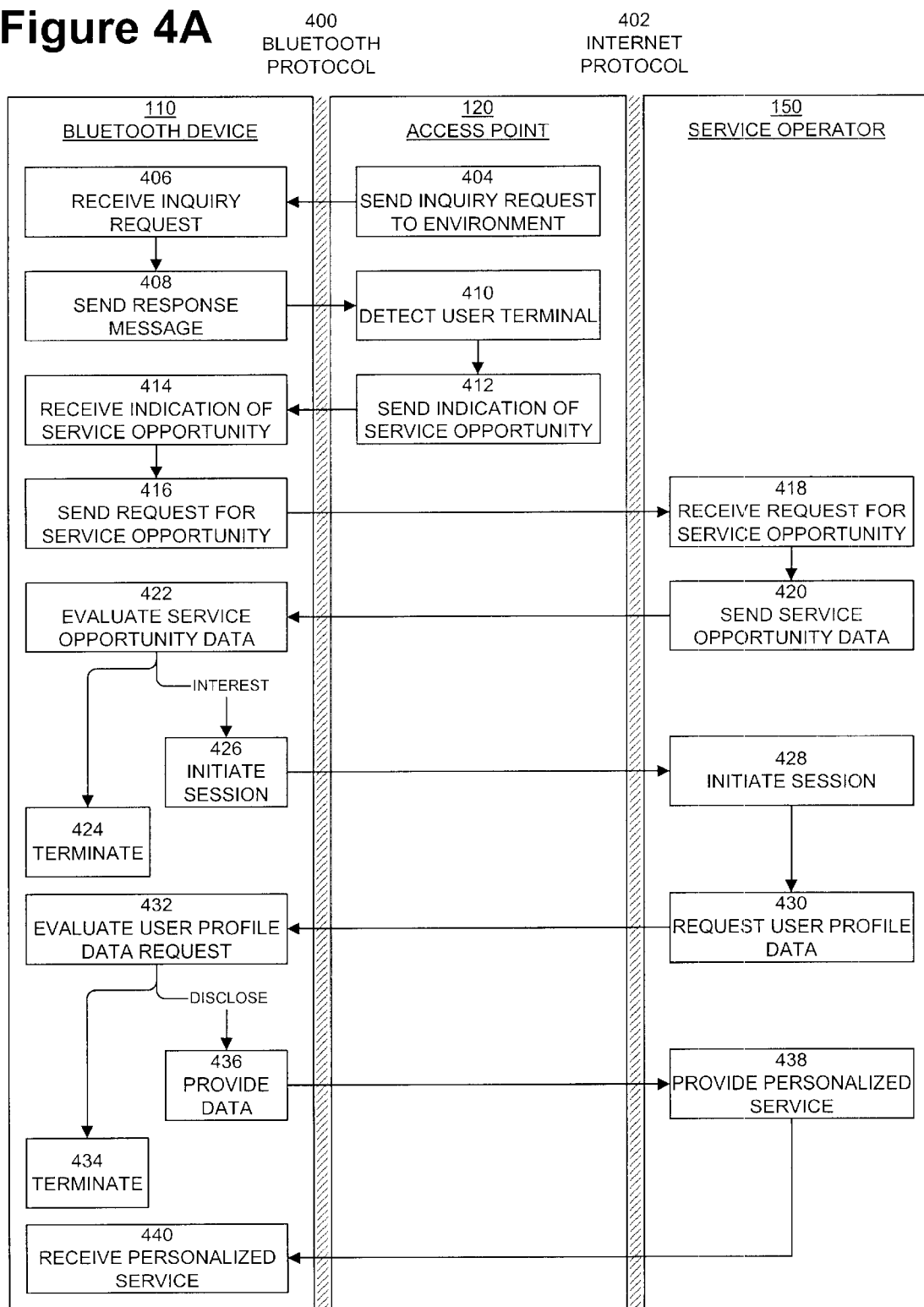

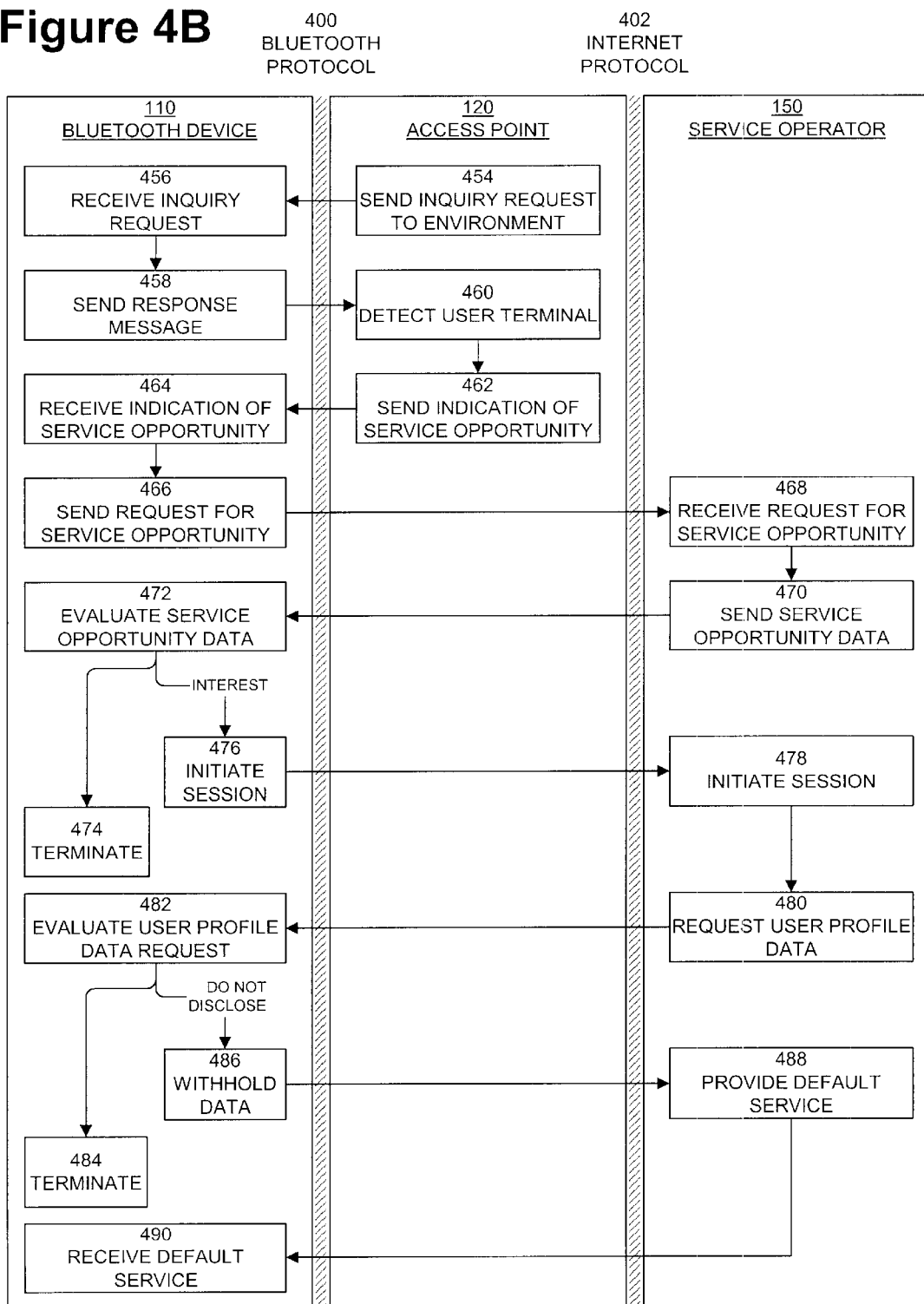

METHOD, SYSTEM, AND APPARATUS FOR PROVIDING SERVICES IN A PRIVACY ENABLED MOBILE AND UBICOM ENVIRONMENT

FIELD OF THE INVENTION

A method, system, and apparatus for protecting personal privacy in a wireless local area network. In particular, the method, system, and apparatus provide wireless communication services that control the dissemination of personal data in the wireless local area network.

BACKGROUND OF THE INVENTION

Rapid advancements in wireless communication and electronic commerce technologies have increased the number of users or users who have access to a mobile or wireless device to access electronic services. Since each transaction requires the transfer of information concerning a user, privacy issues are a growing concern for electronic commerce vendors. Survival in a competitive marketplace demands that vendors incorporate mechanisms for protecting the dissemination of the user's personal information into the services that they offer.

The demand for personal communication services, in particular wireless communication services, have increased in recent years. Furthermore, services mainly rely on mobile telephony and personal digital assistants ("PDAs") to provide a user with instant access to the Internet. Future personal wireless communication systems such as those studied by the Ubiquitous Communications ("Ubicom") program will enable the exchange of visual information between mobile users that will exceed the web browsing and extended capabilities of contemporary mobile telephones. As networked computing resources are becoming more ubiquitous, the Ubicom program envisions personal wearable systems that process information from sensors, combines the result with information from other sources, and presents the output to the user in an audio/visual format. A Ubicom terminal includes a processor that requires low power consumption, low latency, and maintains a specified quality of service.

Bluetooth is a global de facto standard for wireless connectivity, which is based on a low-cost, short-range radio link. When two Bluetooth devices are within a range of ten meters, they can establish a connection together using a radio-based link. As an example, a laptop computer enabled with Bluetooth can send information to a printer in the next room, or a microwave oven can send a message to a mobile phone to announce that that a meal is ready. Bluetooth is quickly becoming accepted as the standard in mobile phones, personal computers, laptops and other electronic devices that enables users to share information, synchronize data, access the Internet, integrate with local area networks or actuate electromechanical devices such as unlocking a car door. Bluetooth replaces the cables that connect various digital devices. An example is a headset for a mobile phone that does not require a cable because it allows calls to be transmitted wirelessly to the earpiece. Bluetooth enables mobile imaging by allowing a PDA to receive images taken on a Bluetooth equipped digital camera. In such an application, the user can add a few lines of text and forward the received photograph to another Bluetooth-enabled device, where it can be viewed, printed or saved on a CD-ROM. Additional discussion of Bluetooth is provided in the book by Brent A. Miller et al., entitled "Bluetooth Revealed", published by Prentice Hall PTR, 2001.

Terminals such as the Ubicom need to support certain features required by the service providers to be able to provide sufficient privacy-enabled personalized services. Also, the terminals need to be able to communicate with different services. Prior art terminals:

Cannot control the level of anonymity for the user;

Do not take advantage of profiles stored on the terminal;

Do not provide feedback about the level of privacy selected; and

Do not provide for secure transmission of data.

Thus, there is a need for a method, system, and apparatus for protecting personal privacy in a wireless local area network using a framework to monitor communications at both the terminal and the service. The privacy services ensure that a mobile or Ubicom environment will protect personal information communicated in the environment. The method, system, and apparatus that addresses this need will enhance the usefulness of a mobile device for location based privacy-enabled personalized services. The method, system, and apparatus for protecting personal privacy in a wireless local area network disclosed herein address this need.

SUMMARY OF THE INVENTION

A method, system, and apparatus for protecting personal privacy in a wireless local area network using a framework at both the terminal and the service in the wireless local area network. The method, system, and apparatus disclosed herein allows the owner of a shopping center premises and the owners of the businesses that rent space from the premises owner to quickly adopt new user-oriented business models that comply with user needs for personalized electronic services. The method, system, and apparatus also maintains an enhanced privacy level, and utilize wireless terminals that contain user profile data and technology environments like Bluetooth wireless local area network ("WLAN") and mobile Internet appliances. The invention can bring significant savings to the business model for the premises or business owner because they do not need to implement a privacy intrusion solution to protect wireless electronic commerce transactions. In addition, the invention allows the premises or business owner to personalize their marketing efforts and collect user behavior profiles.

The invention disclosed herein is a Ubicom Terminal Framework ("UTF") that provides user profiling, user interface, and user privacy services to a Ubicom terminal or wireless Internet service upon request from the service. The service negotiation is handled through a UTF Connector at both the Ubicom terminal and the service. The UTF monitors all information that the Ubicom terminal reveals to the service and notifies the user when a potential privacy risk may occur. When such a case occurs, the UTF also presents a set of choices to the user, so that he can define a desired privacy level for the situation.

The invention also includes service components that interpret the desired privacy level and parameters of each user and personalizes the service accordingly. The service components also include functionality to request and handle user data from the Ubicom terminal that comply with the user's desired Privacy level and settings and still can be used for a Ubicom Customer Relationship Management ("UbiCRM") purpose.

The invention also contemplates the use of a privacy certificate and certification model during the handling and processing of user profile data. In addition, the user can utilize a trusted third party to enforce his privacy settings in the execution of the service and UbiCRM. Also, the service provider would most likely benefit from applying for a privacy certificate in order to gain initial or additional user trust.

BRIEF DESCRIPTION OF THE DRAWINGS

The accompanying figures best illustrate the details of the method, system, and apparatus for protecting personal privacy in a mobile communication environment, both as to its structure and operation. Like reference numbers and designations in these figures refer to like elements.

FIG. 4A is a flow diagram of an embodiment of a process that delivers a personalized service to Bluetooth device 110 when user 100 sets the privacy level to allow the service.

FIG. 4B is a flow diagram of an embodiment of a process that delivers a default service to Bluetooth device 110 when user 100 sets the privacy level to block the service.

DETAILED DESCRIPTION OF THE INVENTION

The mobile communication services for controlling dissemination of personal data as disclosed herein facilitate the supply of profiled services that comply with an individual user's privacy demand. The mobile communication services provide a model that embeds the invented technology in each stage of the process and uses it for service provisioning or delivery. These mobile services are useful in an environment such as a shopping mall, airport, or along a shopping street where many stores may want to communicate with users using a mobile terminal in a local environment. Some issues that arise for the user include:

1. ensuring that the service is willing to initiate a service session while respecting the users privacy needs in the specific context;
2. ensuring that the privacy terms for using the service is negotiated, with proper exchange of privacy certificates; and
3. ensuring that a third party attests that the service has been audited and may be forced to apply the negotiated privacy terms.

Figure 1:
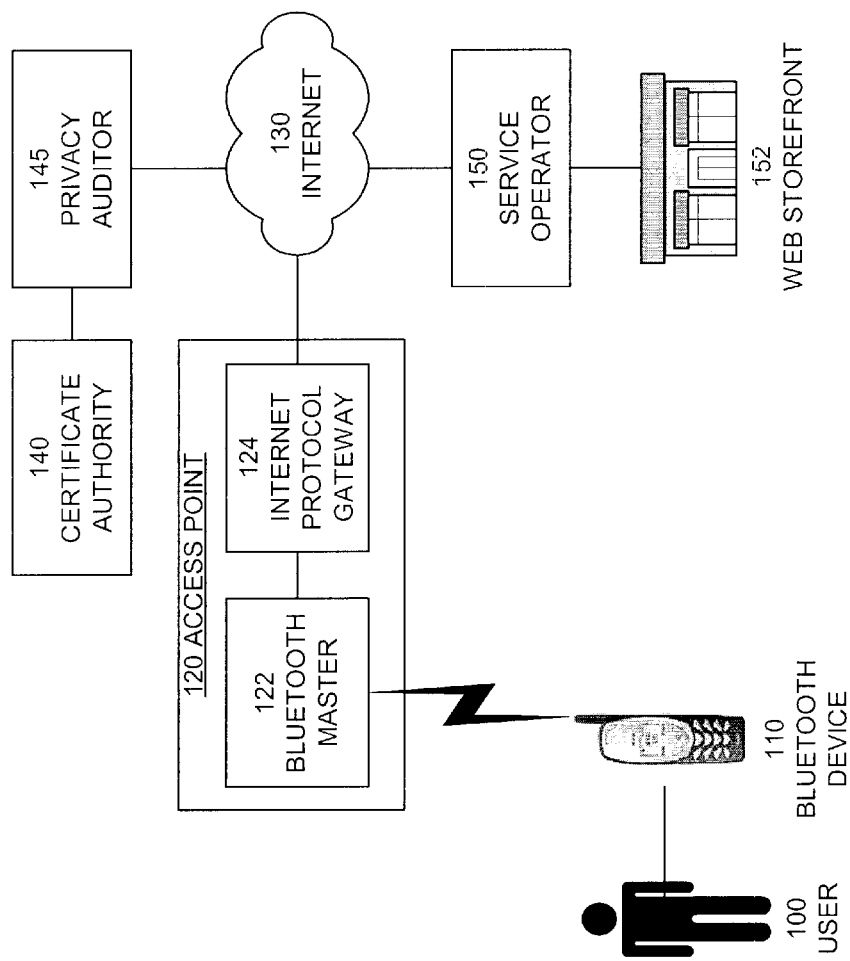
FIG. 1 is a network diagram depicting an embodiment of an operating environment that includes mobile communication services for controlling dissemination of personal data as disclosed herein.

FIG. 1 is a network diagram depicting an embodiment of an operating environment that includes mobile communication services for controlling dissemination of personal data. A supply and demand model defines the provisioning of the mobile communication services. In one embodiment, the premises owner of a shopping mall may supply a Ubicom terminal to a business that rents space in the shopping mall in return for sharing profile data that can be sold to other businesses. In another embodiment, an owner of business that rents space in the shopping mall may share profile data with the premise owner of the shopping mall, but may also use the profile data to refine direct marketing efforts. In yet another embodiment, the user supplies profile data to the premise and business owners in exchange for service opportunities.

User 100 uses Bluetooth device 110 to communicate with web storefront 152. Bluetooth device 110 uses a radio frequency signal that includes data adhering to the Bluetooth protocol and specification to communicate data with access point 120. Access point 120 comprises Bluetooth master 122 and Internet protocol gateway 124. Bluetooth master 122 receives the radio frequency signal from Bluetooth device 110 and relies upon Internet protocol gateway 124 to convert the data from the Bluetooth protocol to the Internet protocol. Internet protocol gateway 124 uses wired connections such as coaxial and fiber optic cable to communicate data adhering to the Internet Protocol with Internet 130. Service operator 150 connects to Internet 130. Web storefront 152 receives data from Bluetooth device 110 through service operator 150. User 100 as disclosed herein can be either a consumer or a seller of the service offered by service operator 150.

In another embodiment, the operating environment contemplates replacing Internet 130 with a network such as an intranet, extranet, or local area network. An intranet is a private communication network that functions similar to the Internet 130. An organization, such as a corporation, creates an intranet to provide a secure means for members of the organization to access the resources on the organization's network. An extranet is also a private communication network that functions similar to the Internet 130. In contrast to an intranet, an extranet provides a secure means for the organization to authorize non-members of the organization to access certain resources on the organization's network. In another embodiment, the operating environment contemplates using a network protocol such as Ethernet or Token Ring, as well as, proprietary network protocols.

Bluetooth device 110 uses access point 120 in an alternative embodiment to communicate data with certificate authority 140. Certificate authority 140 is an organization that issues public key certificates. A certificate issued by certificate authority 140 for user 100 is signed using the certificate authority 140 private key and includes data such as the name, public key, date of issue, date of expiration, and serial number for the user 100.

Bluetooth device 110 uses access point 120 in an alternative embodiment to communicate data with privacy auditor 145. Privacy auditor 145 is a person or organization who represents user 100 during privacy intrusion detection or theft investigations. Privacy auditor 145 monitors the use of a certificate to proactively detect privacy intrusion or theft. In another embodiment, a clearing center gathers pointers to services containing all of a user's private personal data that was disclosed during a service session. Privacy auditor 145 can search the data to associate the receipt of personal data with an entity such as web storefront 152 and can enforce the service to delete the data by engaging the clearing center on behalf of user 100. The clearing center also settles privacy transaction and may transfer information about traded privacy data for reimbursement in loyalty points, or coupons to service aggregators.

Figure 2A:
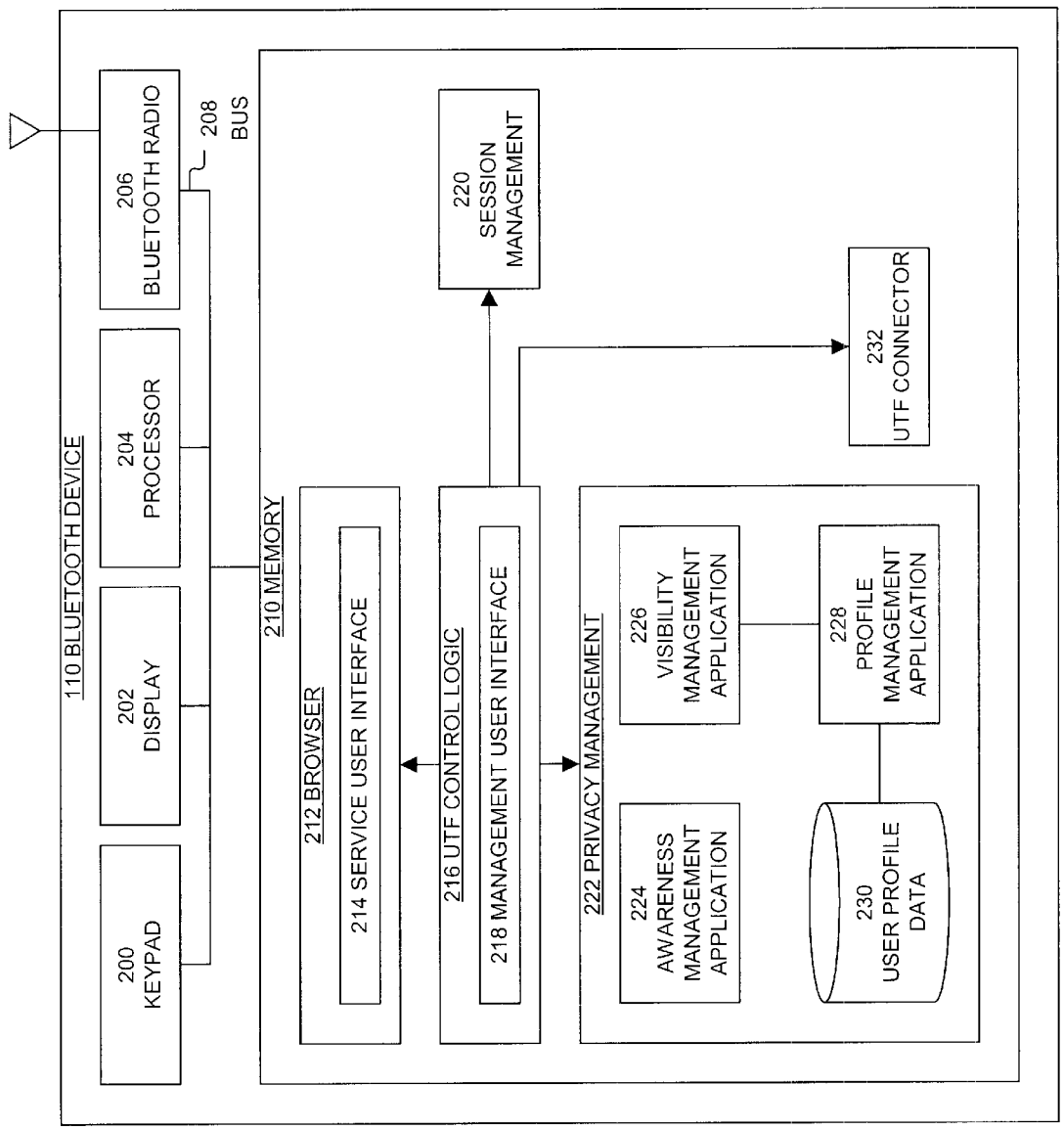
FIG. 2A is a functional block diagram depicting Bluetooth device 110, in greater detail, to show the components that comprise the mobile communication services for controlling dissemination of personal data.

FIG. 2A is a functional block diagram depicting Bluetooth device 110, in greater detail to show the components that comprise the mobile communication services for controlling dissemination of personal data. Bus 208 connects keypad 200, display 202, processor 204, and Bluetooth radio 206 to memory 210. Processor 204 performs the methods disclosed herein by executing the sequences of operational instructions that comprise each computer program resident in memory 210. Memory 210 includes browser 212, Ubicom Terminal Framework ("UTF") control logic 216, session management 220 programs, privacy management 222 programs, and UTF connector 232.

Browser 212 is a web browser, wireless access protocol ("WAP") browser, or graphical user interface for a wireless device that displays data such as service user interface 214 on display 202. In one embodiment, service user interface 214 is a web page that includes the service opportunities that web storefront 152 is offering to user 100. These service opportunities include promotional offers, product advertisements, and employment opportunities. In addition, service user interface 214 includes Ubicom Customer Relationship Management ("UbiCRM") connectors that scan session communications and transactions for private personal information. Combining these results with the privacy rules produces customer data compliant with the privacy policy on other systems.

UTF control logic 216 coordinates the transfer of data between service operator 150 and browser 212 or privacy management 222 programs. UTF control logic 216 includes management user interface 218 to provide user 100 with the ability to set and modify any property of the UTF. These properties include setting the anonymity level for user 100, controlling which types of services will receive profile data from user 100, negotiating the session level security such as secure socket layer ("SSL"), and providing a digital certificate to the terminal.

Session management 220 programs manage the communication between Bluetooth device 110 and service operator 150. The management of session communication with service operator 150 includes creation of the socket connection, binding the socket to a port, error checking, and termination of the socket connection.

Privacy management 222 programs restrict communication between user 100 and service operator 150 based on the privacy level set by user 100. Privacy management 222 includes awareness management application 224, visibility management application 226, profile management application 228, and user profile data 230.

Awareness management application 224 accesses a history of recently encountered services, however, memory 210 only stores services that user 100 finds interesting. For example, if user 100 indicates that he has an interest in music, memory 210 will only store the most recently encountered music related services. When user 100 encounters a service for a second time, Bluetooth device 110 retrieves the service from memory 210 thereby saving the time it would take to communicate the data from service operator 150.

Visibility management application 226 allows user 100 to control whether service operator 150 can obtain user 100 personal data. User 100 can set his anonymity level to a value such as:

1. Anonymous user for every service and in every situation;
2. Anonymous user who uses a pseudonymous profile data or subset of profile data;
3. Anonymous user only when performing a trusted transaction such as making a payment or placing a vote; or
4. Identified and authenticated user only when performing a trusted transaction such as a bank transaction.

User 100 can also set his profile access level for a type of service such as all music related services, any trusted service that will allow user 100 to remain anonymous, or any trusted service that requires identification and authentication of user 100.

Profile management application 228 retrieves the profile for user 100 from user profile data 230 and transfers the data to visibility management application 226 when it is necessary. Profile management application 228 saves the time that it would take to retrieve the data from user profile data 230 by storing at least a portion of the profile data in memory 210. Other portions of the profile data may be stored in the memory included in service operator 150.

UTF connector 232 dictates how Bluetooth device 110 will protect the privacy of user 100 during communications with service operator 150. The parameters that Bluetooth device 110 negotiates include:

Security Level—Whether Bluetooth encryption is enabled and whether the communication can utilize the secure socket layer;

Privacy Level—Whether user 100 has preset the anonymity level;

Profile Access Level—Whether user 100 has granted access to this service (e.g., read access, read/write access, or no profile used in this session);

Digital Certificates—Whether the digital certificates are being used and, if they are, whether user 100 has a valid certificate; and Terminal Capabilities—What type of terminal is user 100 using, the display size, and which colors does the terminal support.

Figure 2B:
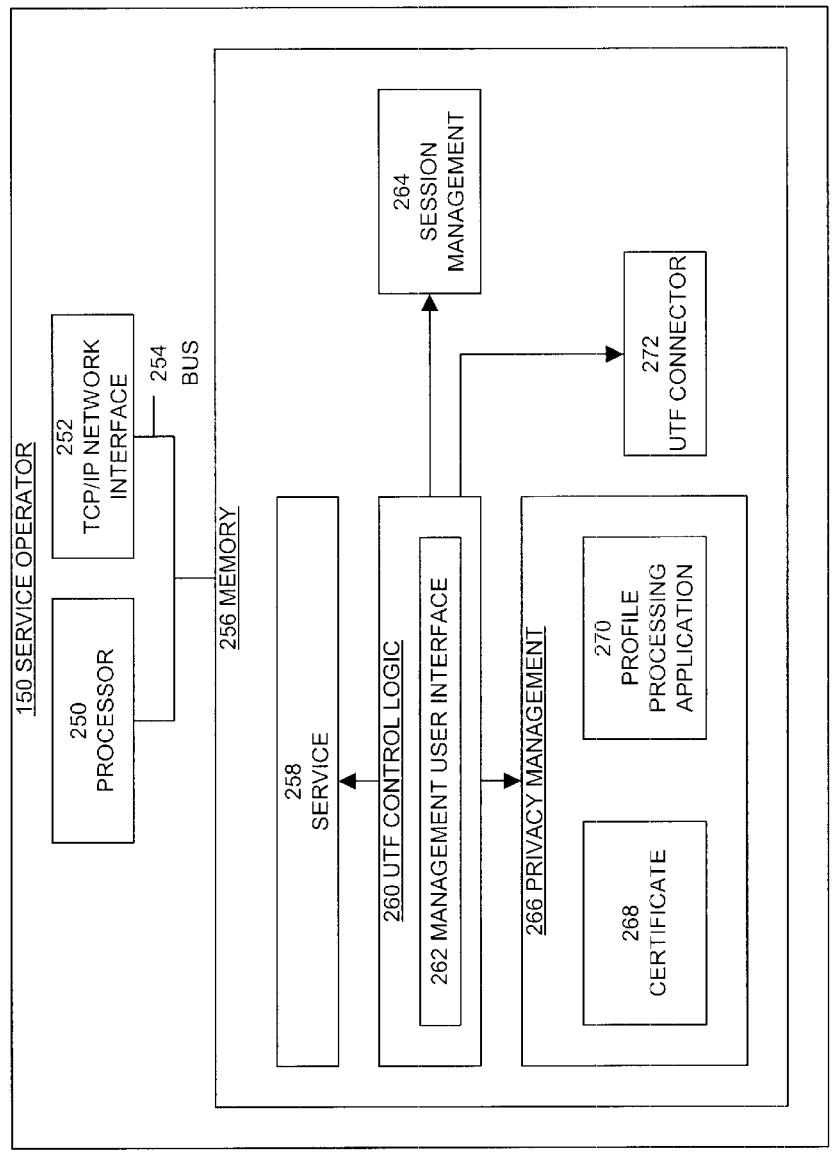
FIG. 2B is a functional block diagram depicting service operator 150, in greater detail, to show the components that comprise the mobile communication services for controlling dissemination of personal data.

FIG. 2B is a functional block diagram depicting service operator 150, in greater detail, to show the components that comprise the mobile communication services for controlling dissemination of personal data. Bus 254 connects processor 250 and Transmission Control Protocol/Internet Protocol ("TCP/IP") network interface 252 to memory 256. Processor 250 performs the methods disclosed herein by executing the sequences of operational instructions that comprise each computer program resident in memory 256. Memory 256 includes service 258, UTF control logic 260, session management 264 programs, privacy management 266 programs, and UTF connector 272.

Service 258 generates an offer for a service opportunity (i.e., a commercial message, or message) from web storefront 152 to user 100. If user 100 demonstrates an interest in the service opportunity, service 258 manages the message communication between Bluetooth device 110 and service operator 150.

UTF control logic 260 coordinates the transfer of data between Bluetooth device 110 and service 258 or privacy management 266 programs. UTF control logic 260 includes management user interface 262 to provide web storefront 152 with the ability to set and modify any property of the UTF. These properties include negotiating the session level security such as secure socket layer ("SSL"), and providing a digital certificate to the terminal.

Session management 264 programs manage the communication between Bluetooth device 110 and service operator 150. The management of session communication with Bluetooth device 110 includes creation of the socket connection, binding the socket to a port, error checking, and termination of the socket connection.

Privacy management 266 programs restrict communication between user 100 and service operator 150 based on the privacy level set by user 100. Privacy management 266 includes certificate 268 and profile processing application 270. Certificate 268 is a public key certificate such as an X.509 v3 certificate. Profile processing application 270 retrieves profile data from user profile data 230 and stores the result.

UTF connector 272 dictates how service operator 150 will protect the privacy of user 100 during communications with Bluetooth device 110. The parameters that service operator 150 negotiates include:

Security Level—Whether Bluetooth encryption is enabled and whether the communication can utilize the secure socket layer;

Privacy Level—Whether user 100 has preset the anonymity level;

Profile Access Level—Whether user 100 has granted access to this service (e.g., read access, read/write access, or no profile used in this session);

Digital Certificates—Whether the digital certificates are being used and, if they are, whether user 100 has a valid certificate; and Terminal Capabilities—What type of terminal is user 100 using, the display size, and which colors does the terminal support.

Figure 3:
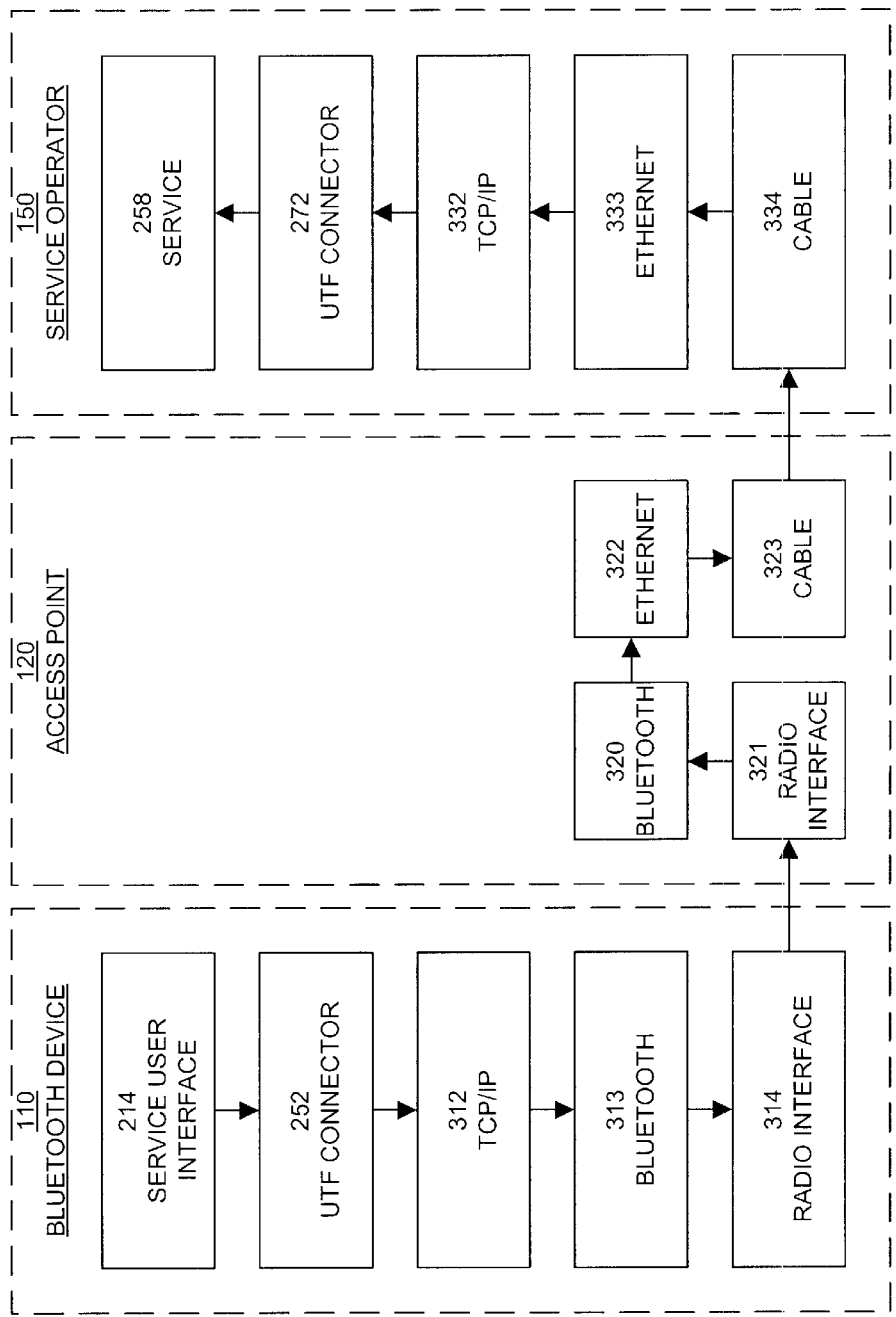
FIG. 3 depicts the role that the Ubicom Terminal Framework ("UTF") connector serves during communication between Bluetooth device 110 and service operator 150.

FIG. 3 depicts the role that the UTF connector serves during communication from Bluetooth device 110 to service operator 150 in a manner similar to the depiction of the stack in the Open System Interconnection ("OSI") Reference Model. Each communication requires two data transfers. Bluetooth device 110 first transfers a packet of data to access point 120 where the packet is converted from the Bluetooth protocol to the transmission control protocol/Internet protocol ("TCP/IP") protocol. Access point 120 performs the second transfer of the packet to service operator 150. Before Bluetooth device 110 can transfer the packet to access point 120, the packet descends the stack on Bluetooth device 110. To convert the packet from the Bluetooth protocol to TCP/IP, the packet ascends and descends the stack on access point 120. Before service operator 150 can use the data embedded in the packet, the packet ascends the stack on service operator 150.

The stack for Bluetooth device 110 includes service user interface 214, UTF connector 252, TCP/IP 312, Bluetooth 313, and radio interface 314. Service user interface 214 forms a packet of data. Each component of the stack is responsible for ensuring that the packet adheres to a given specification or protocol. UTF connector 252 ensures that the packet adheres to the privacy guidelines as disclosed herein. TCP/IP 312 wraps the packet with an Internet protocol ("IP") header and trailer. Bluetooth 313 wraps the packet with a Bluetooth header and trailer. Radio interface 314 converts the packet to a short-range radio frequency signal such as the 2.4 GHz spectrum.

The stack for access point 120 includes radio interface 321, Bluetooth 320, Ethernet 322, and cable 323. Radio interface 321 receives the short-range radio frequency signal from radio interface 314. Bluetooth 320 strips the Bluetooth header and trailer off the packet. Ethernet 322 wraps the packet with an Ethernet header and trailer. Cable 323 converts the packet for transmission over a wired connection such as a coaxial for fiber optic cable.

The stack for service operator 150 includes cable 334, Ethernet 333, TCP/IP 332, UTF connector 272, and service 258. Cable 334 receives the transmission of the packet over a wired connection such as a coaxial or fiber optic cable. Ethernet 333 strips the Ethernet header and trailer off the packet. TCP/IP 332 strips the IP header and trailer off the packet. UTF connector 272 ensures that the packet adheres to the privacy guidelines as disclosed herein. Service 258 interprets the packet of data for service operator 150.

FIG. 4A is a flow diagram of an embodiment of a process that delivers a personalized service to Bluetooth device 110 when user 100 sets the privacy level to allow the service. The process begins at step 404 with access point 120 sending an inquiry request message to the environment. If Bluetooth device 110 is in the environment and actively listening, it receives the inquiry request at step 406. Bluetooth device 110 then sends a response message to access point 120 at step 408. Access point 120 detects the presence of Bluetooth device 110 at step 410 and sends a message to Bluetooth device 110 at step 412 to indicate that a service opportunity is available from service operator 150. Bluetooth device 110 receives the indication of a service opportunity at step 414 and responds by sending a request for the service opportunity at step 416 to service operator 150. Service operator 150 receives the request for the service opportunity at step 418 and sends the service opportunity data at step 420 to Bluetooth device 110. At step 422, Bluetooth device 110 evaluates the service opportunity data. User 100 may terminate the process at step 424. Alternatively, if user 100 is interested in the service opportunity, Bluetooth device 110 and service operator 150 initiate a session at steps 426 and 428, respectively. At step 430, service operator 150 sends a request for user profile data to Bluetooth device 110. At step 432, Bluetooth device 110 evaluates the user profile data request. User 100 may terminate the process at step 434. Alternatively, if user 100 selected a privacy level as disclosed herein that indicates to disclose his user profile data for this type of service opportunity, Bluetooth device 110 will provide profile data at step 436 to service operator 150. At step 438, service operator 150 receives the data and personalizes the service opportunity for user 100 and provides the personalized service to Bluetooth device 110. At step 440, Bluetooth device 110 receives the personalize service.

Bluetooth device 110 adheres to Bluetooth protocol 400 and service operator 150 adheres to the Internet protocol 402. Since these protocols are not compatible, access point 120 performs a conversion from one protocol to the other protocol. Access point 120 facilitates a conversion from Bluetooth protocol 400 to Internet protocol 402 for the communication from step 416 to step 418, step 426 to step 428, and step 436 to step 438. Similarly, access point 120 facilitates a conversion from Internet protocol 402 to Bluetooth protocol 400 for the communication from step 420 to step 422, step 430 to step 432, and step 438 to step 440.

FIG. 4B is a flow diagram of an embodiment of a process that delivers a default service to Bluetooth device 110 when user 100 sets the privacy level to block the service. The process begins at step 454 with access point 120 sending an inquiry request message to the environment. If Bluetooth device 110 is in the environment and actively listening, it receives the inquiry request at step 456. Bluetooth device 110 then sends a response message to access point 120 at step 458. Access point 120 detects the presence of Bluetooth device 110 at step 460 and sends a message to Bluetooth device 110 at step 462 to indicate that a service opportunity is available from service operator 150. Bluetooth device 110 receives the indication of a service opportunity at step 464 and responds by sending a request for the service opportunity at step 466 to service operator 150. Service operator 150 receives the request for the service opportunity at step 468 and sends the service opportunity data at step 470 to Bluetooth device 110. At step 472, Bluetooth device 110 evaluates the service opportunity data. User 100 may terminate the process at step 474. Alternatively, if user 100 is interested in the service opportunity, Bluetooth device 110 and service operator 150 initiate a session at steps 476 and 478, respectively. At step 480, service operator 150 sends a request for user profile data to Bluetooth device 110. At step 482, Bluetooth device 110 evaluates the user profile data request. User 100 may terminate the process at step 484. Alternatively, if user 100 selected a privacy level as disclosed herein that indicates to not disclose his user profile data for this type of service opportunity, Bluetooth device 110 will withhold sending profile data at step 486 to service operator 150. At step 488, service operator 150 provides a default service to Bluetooth device 110 because user 100 did not want to disclose any profile data. At step 490, Bluetooth device 110 receives the default service.

Bluetooth device 110 adheres to Bluetooth protocol 400 and service operator 150 adheres to the Internet protocol 402. Since these protocols are not compatible, access point 120 performs a conversion from one protocol to the other protocol. Access point 120 facilitates a conversion from Bluetooth protocol 400 to Internet protocol 402 for the communication from step 416 to step 418, step 426 to step 428, step 436 to step 438, step 466 to step 468, step 476 to step 478, and step 486 to step 488. Similarly, access point 120 facilitates a conversion from Internet protocol 402 to Bluetooth protocol 400 for the communication from step 420 to step 422, step 430 to step 432, step 438 to step 440, step 470 to step 472, step 480 to step 482, and step 488 to step 490.

Although the embodiments disclosed herein describe a fully functioning method, system, and apparatus for protecting personal privacy in a wireless local area network, the reader should understand that other equivalent embodiments exist. Since numerous modifications and variations will occur to those who review this disclosure, the system for protecting person privacy in a wireless local area network is not limited to the exact construction and operation illustrated and described herein. Accordingly, this disclosure intends all suitable modifications and equivalents to fall within the scope of the claims.

We claim:

1. A wireless network system for controlling the disclosure of user profile data comprising:
    a wireless device including a memory storing:
        the user profile data; and
        a privacy component that restricts communication between the wireless device and a service operator based on a potential privacy risk associated with disclosure of the user profile data to the service operator; and
    an access point coupled to the wireless device and a wired network, the access point facilitating communication between the wireless device and a wired network,
    wherein the service operator is coupled to the wired network, offers the service opportunity to the user, and sends the service opportunity to the user.

2. The system of claim 1, wherein the wireless device is a Bluetooth device.

3. The system of claim 1, wherein the service operator personalizes the service opportunity for the user if the user profile data indicates that the user is interested in this type of service opportunity.

4. The system of claim 1, wherein the service operator personalizes the service opportunity for the user if the user profile data indicates that the user is interested in this service operator.

5. The system of claim 1, wherein the privacy component further comprises:
    a service user interface component that displays the service opportunity to the user;
    a management user interface component that allows the user to modify at least one property of the wireless network system;
    a privacy management component that develops a set of privacy rules for restricting communication between the wireless device and the service operator based on said at least one property; and
    a connector component that applies the set of privacy rules to each communication between the wireless device and the service operator.

6. The system of claim 5, wherein the privacy management component further comprises:
    an awareness management component that stores a history of service opportunities that satisfy the set of privacy rules;
    a visibility management component that allows the user to set a privacy level; and
    a profile management component that retrieves or updates the user profile data.

7. A method of controlling the disclosure of personal data on a wireless network comprising:
    receiving an indication of a service opportunity from a service operator;
    requesting the service opportunity;
    if a user has an interest in the service opportunity, initiating a session with the service operator;
    determining a potential privacy risk associated with disclosure of the user profile data to the service operator;
    if the user consents to the potential privacy risk, sending at least a portion of the user profile data; and
    receiving the service opportunity personalized for the user.

8. The method of claim 7, wherein receiving the indication of the service opportunity further comprises:
    receiving an inquiry request from an access point; and
    sending a response message to the access point.

9. A method of controlling the disclosure of personal data on a wireless network comprising:
    receiving a request for a service opportunity from a wireless device;
    sending service opportunity data;
    if a user has an interest in the service opportunity, initiating a session with the wireless device;
    requesting user profile data;
    receiving at least a portion of the user profile data from the wireless device, wherein the wireless device sends said at least a portion after determining a potential privacy risk associated with disclosure of the user profile data; and
    sending a personalized service opportunity to the user.

10. The method of claim 9, wherein the wireless device is a Bluetooth device.

11. A method of controlling the disclosure of personal data on a wireless network comprising:
    receiving an indication of a service opportunity from a service operator;
    requesting the service opportunity;
    if a user has an interest in the service opportunity, initiating a session with the service operator;
    determining a potential privacy risk associated with disclosure of the user profile data to the service operator;
    if the user does not consent to the potential privacy risk, withholding at least a portion of the user profile data; and
    receiving the service opportunity in a default form.

12. The method of claim 11, wherein receiving the indication of the service opportunity further comprises:

receiving an inquiry request from an access point; and sending a response message to the access point.

13. A method of controlling the disclosure of personal data on a wireless network comprising:

receiving a request for a service opportunity from a wireless device;

sending service opportunity data;

if a user has an interest in the service opportunity, initiating a session with the wireless device;

requesting user profile data; and if the user does not consent to a potential privacy risk associated with disclosure of the user profile data to the service operator, sending the service opportunity in a default form.

14. The method of claim 13, wherein the wireless device is a Bluetooth device.

15. A computer device for controlling the disclosure of user profile data comprising:

a memory device; and a processor disposed in communication with the memory device, the processor configured to:

store the user profile data;

display the service opportunity to a user of the wireless device;

restrict communication between the wireless device and a service operator based on a potential privacy risk associated with disclosure of the user profile data to the service operator;

communicate with the service operator over a wired network;

receive a service opportunity from the service operator; and evaluate the service opportunity to determine whether a user consents to disclosure of the user profile data for the service opportunity.

16. The computer device of claim 15, wherein the service operator personalizes the service opportunity for the user if the user profile data indicates that the user is interested in this type of service opportunity.

17. The computer device of claim 15, wherein the service operator personalizes the service opportunity for the user if the user profile data indicates that the user is interested in this service operator.

18. The computer device of claim 15, wherein the processor is further configured to:

display the service opportunity to the user;

allow the user to modify at least one property of the wireless network system;

develop a set of privacy rules for restricting communication between the wireless device and the service operator based on said at least one property; and apply the set of privacy rules to each communication between the wireless device and the service operator.

19. The computer device of claim 18, wherein the processor is further configured to:

store a history of service opportunities that satisfy the set of privacy rules;

allow the user to set a privacy level; and retrieve or update the user profile data.

20. A computer readable medium for controlling the disclosure of user profile data comprising:

code for storing the user profile data;

code for displaying the service opportunity to a user of the wireless device;

code for restricting communication between the wireless device and a service operator based on a potential privacy risk associated with disclosure of the user profile data to the service operator;

code for communicating with the service operator over a wired network;

code for receiving a service opportunity from the service operator; and code for evaluating the service opportunity to determine whether a user consents to disclosure of the user profile data for the service opportunity.

21. The computer readable medium of claim 20, wherein the service operator personalizes the service opportunity for the user if the user profile data indicates that the user is interested in this type of service opportunity.

22. The computer readable medium of claim 20, wherein the service operator personalizes the service opportunity for the user if the user profile data indicates that the user is interested in this service operator.

23. The computer readable medium of claim 20, further comprising:

code for displaying the service opportunity to the user;

code for allowing the user to modify at least one property of the wireless network system;

code for developing a set of privacy rules for restricting communication between the wireless device and the service operator based on said at least one property; and code for applying the set of privacy rules to each communication between the wireless device and the service operator.

24. The computer readable medium of claim 23, wherein the code for developing the set of privacy rules further comprises:

code for storing a history of service opportunities that satisfy the set of privacy rules;

code for allowing the user to set a privacy level; and code for retrieving or updating the user profile data.

25. A system for intelligently distributing a commercial message to a user comprising:

a wireless device carried by the user, the wireless device including user profile data that characterizes the user and a privacy component that restricts communication between the wireless device and a service operator based on a potential privacy risk associated with disclosure of the user profile data to the service operator;

at least one geographically distributed access point;

a server coupled to said at least one geographically distributed access point, the server including a database that stores at least a portion of the user profile data and at least one commercial message categorized by generic user characteristics;

the wireless device sending a user identifying signal to the server through said at least one access point; and the server operating on the signal to select a message from its database associated with the generic user characteristics and sending the selected message to the wireless device via said at least one access point.

26. The system of claim 25, wherein the wireless device is a Bluetooth device.

* * * * *